United States Patent [19]

Goya

[11] Patent Number: 5,438,811
[45] Date of Patent: Aug. 8, 1995

[54] JOINTING METAL FIXTURE FOR CONSTRUCTION

[75] Inventor: Shigeo Goya, 27-1, Kumoji 3-chome, Naha-shi, Okinawa-ken, Japan

[73] Assignees: Shigeo Goya; Shigeru Goya, both of Naha, Japan

[21] Appl. No.: 167,030

[22] Filed: Dec. 16, 1993

[30] Foreign Application Priority Data

Mar. 22, 1993 [JP] Japan .............. 5-018850 U

[51] Int. Cl.⁶ .............................................. E04B 1/38
[52] U.S. Cl. ........................... 52/702; 52/704; 52/698; 52/656.9; 52/737.2; 403/230; 403/237
[58] Field of Search ................ 52/698, 702, 704, 706, 52/708, 709, 656.9, 655.1, 721; 5/288, 290; 403/231, 237, 174, 217, 230; 211/192; 248/247, 250

[56] References Cited

U.S. PATENT DOCUMENTS

| 65,970 | 6/1867 | Wardwell | 5/288 |
|---|---|---|---|
| 832,133 | 10/1906 | Lanz | 52/702 |
| 1,245,537 | 11/1917 | Van Fleet | 403/231 X |
| 4,030,846 | 6/1977 | Flötotto | 403/231 |
| 4,068,332 | 1/1978 | Ball et al. | 403/230 X |
| 4,223,866 | 9/1980 | Black | 52/702 X |
| 5,186,571 | 2/1993 | Hentzschel | 403/231 |
| 5,242,239 | 9/1993 | Hosokawa | 52/721 X |
| 5,253,945 | 10/1993 | Hosokawa | 52/721 X |
| 5,295,754 | 3/1994 | Kato | 52/702 X |

FOREIGN PATENT DOCUMENTS

| 59-217850 | 12/1984 | Japan . |
|---|---|---|
| 1177303 | 12/1989 | Japan . |
| 0411811 | 1/1992 | Japan . |

Primary Examiner—Carl D. Friedman
Assistant Examiner—Robert J. Canfield
Attorney, Agent, or Firm—Kanesaka & Takeuchi

[57] ABSTRACT

A metal fixture is employed for jointing wooden members, such as a pillar, a beam or a joist, in a wooden building or construction. The metal fixture includes a main member having a back surface adapted to be secured to the wooden member, such as a pillar, a pair of lateral extensions projected at right angles to the back surface in parallel with each other and at least one of cogged joint grooves and through-holes formed in each of the lateral extensions, a supporting member for supporting a design bracket, and a fixation unit for fixing the supporting member and the main member to each other. The wooden members may be jointed easily and fixedly to each other, while the jointed portions of the wooden members may be covered up easily with facilitated machining operations for the jointing metal fixture.

6 Claims, 7 Drawing Sheets

JOINTING METAL FIXTURE FOR CONSTRUCTION

BACKGROUND OF THE INVENTION

1. Technical Field of the Invention

This invention relates to a metal fixture employed for jointing wooden members, such as a pillar and a joist or girder in a wooden construction or building. More particularly, It relates to a jointing metal fixture for a construction or building for facilitating the attachment of a design bracket.

2. Explanation of Related Art

Heretofore, a variety of working methods are known in connections and joints in wooden framework constructions. Besides, since the connections and joints are worked on the site of construction, the term off construction tends to be prolonged.

Recently, a wooden framework construction method has come to be used which consists in standardizing the wooden members and the jointing structures and working the connections or joints in a concentrated manner in a plant, with the thus worked wooden members being jointed together on the site of construction using jointing metal fixtures.

The present inventor has made various improvements for raising the operating efficiency in the wooden framework construction on the construction site with the aid of the jointing metal fixtures, and has proposed a new jointing metal fixture in, for example, JP Patent Kokai-Publication No. 59-217850 (1984) and JP Utility Model Kokai-Publication NO. 1-177303 (1989).

However, with the wooden framework construction with the aid of the jointing metal fixtures, there is raised a problem that interstices are inevitably exposed in the jointing portions between the wooden members to detract from the appearance of the wooden construction.

for solving such problem, the present inventor has proposed in JP Utility Model Kokai-Publication No. 4-11811 (1992) a jointing metal fixture for a construction in which the jointing portions are covered up with a design bracket.

The jointing metal fixture is exceedingly superior to the conventional jointing metal fixture since it is possible with the jointing metal fixture to cover up the interstices at the jointing portions of the wooden members with the design bracket in a simple manner.

However, it is necessary with the jointing meal fixture as proposed in the JP Utility Model Kokai-Publication NO. 1-11811 (1992) to secure a nut to be attached to a bolt for supporting the design bracket in a narrow space between lateral extensions of a main member such as by welding.

Thus there is a room for improvement from the standpoint of preventing the operation of fixation from being complicated and lowered in efficiency.

The present inventor has conducted further researches for obviating the inconveniences.

3. Object of the Invention

It is an object of the present invention to overcome these inconveniences and to provide a jointing metal fixture whereby the jointing of the wooden members may be carried out by a simplified operation on the construction site, the jointing potions of the wooden members may be covered easily and the supporting member necessary for covering the jointed portions may be dismounted easily to permit the construction works in a simple manner.

SUMMARY OF THE INVENTION

For accomplishing the above object, the present invention provides a metal fixture employed for jointing wooden members, such as a pillar, a beam or a joist, in a wooden building or construction, comprising a main member having a back surface adapted to be secured to the wooden member, such as a pillar, a pair of lateral extensions projected at right angles to the back surface in parallel with each other and at least one of cogged joint grooves and through-holes formed in each of the lateral extensions, a supporting member for supporting a design bracket, and fixation means for fixing the supporting member and the main member to each other.

With the jointing metal fixture for a construction according to the present invention, pin through-holes are formed in the lateral extensions of the main member, and the supporting member has a supporting main body having a nut at one end thereof and a pin through-hole at the other end thereof, and a bolt supporting the design bracket and threadedly engaging with the nut of the supporting main body. The fixation means is an inserting pin passed through the pin-through-hole in the main member and the pin through-hole in the supporting member.

Also, with the jointing metal fixture for a construction according to the present invention, bolt holes are formed in the back surface of the main member, and the supporting member has a supporting main body having a nut and a tightening member secured to the lateral side of the nut and having tightening holes, and a bolt supporting the design bracket and adapted for being threadedly engaged with the nut. The fixation means comprises bolts introduced through the bolt holes in the main member and tightened at the tightening holes.

With the above-described jointing metal fixture according to the present invention, the wooden members may be jointed to one another in a simple and steadfast manner, while the interstices at the connecting portions of the wooden members may be covered up in a simple manner to improve aesthetic effects. Besides, the machining operations on the jointing metal fixture may be simplified significantly.

DETAILED DESCRIPTION OF PREFERRED EMBODIMENTS OF THE INVENTION

Figure 1:
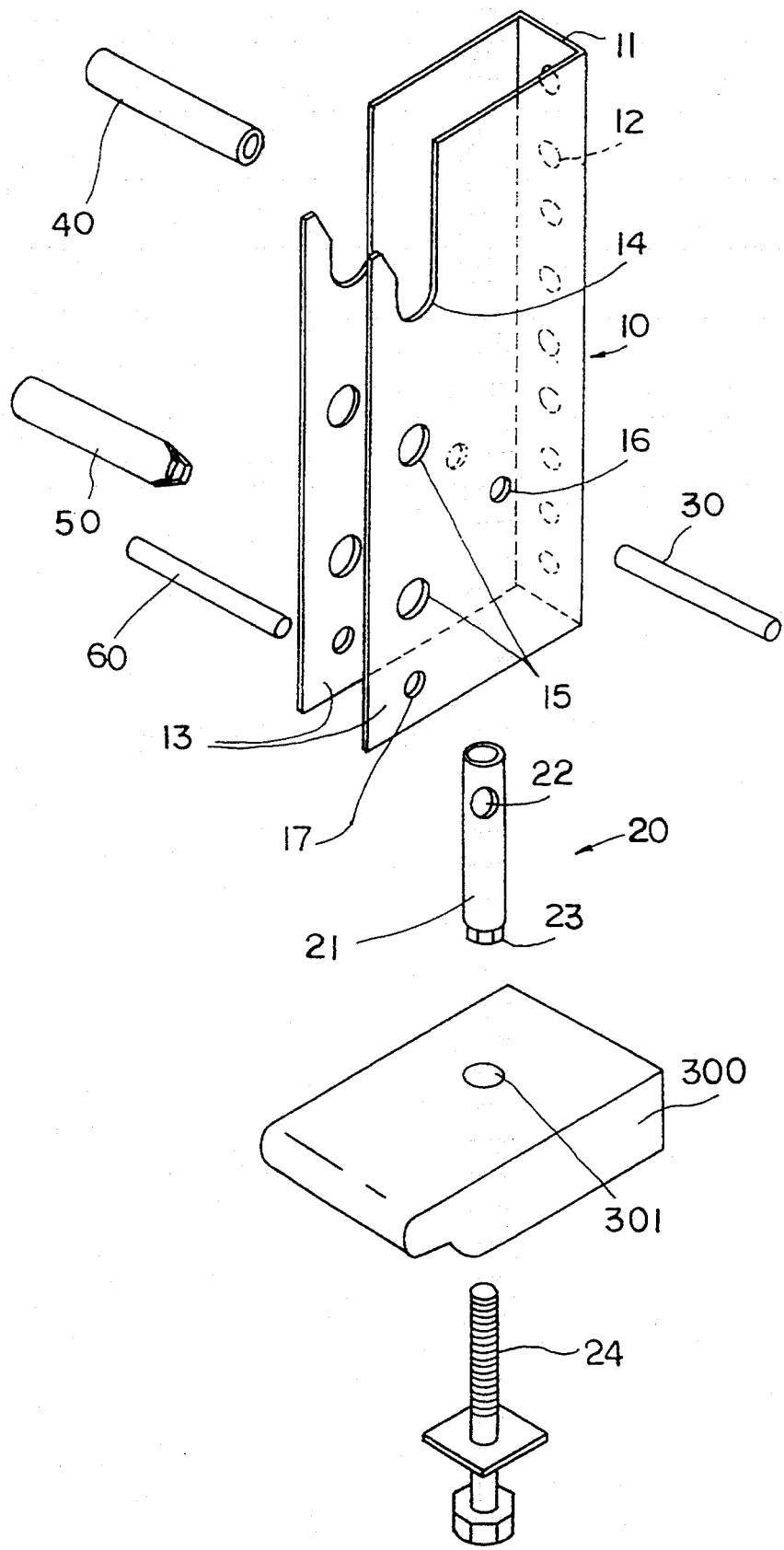
FIG. 1 is an exploded perspective view showing a jointing metal fixture according to a first embodiment of the present invention.

Referring to the drawings, preferred embodiments of the jointing metal fixtures according to the present invention will be explained in detail.

FIGS. 1, 2, 3 and 4 illustrate a first embodiment of the present invention.

Figure 2:
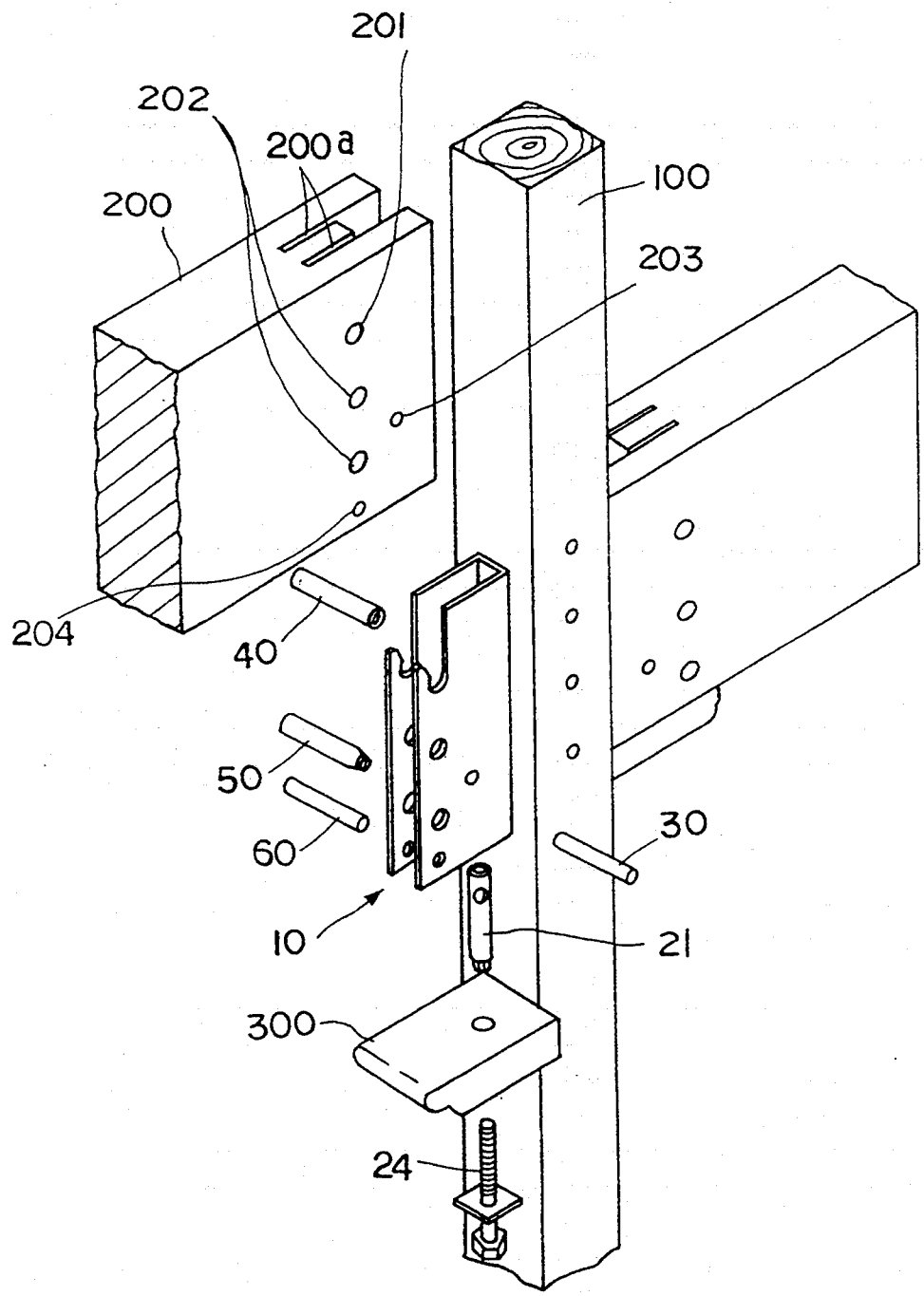
FIG. 2 is an exploded perspective view showing wooden members about to be jointed together using the jointing metal fixture according to the first embodiment of the present invention.
Figure 3:
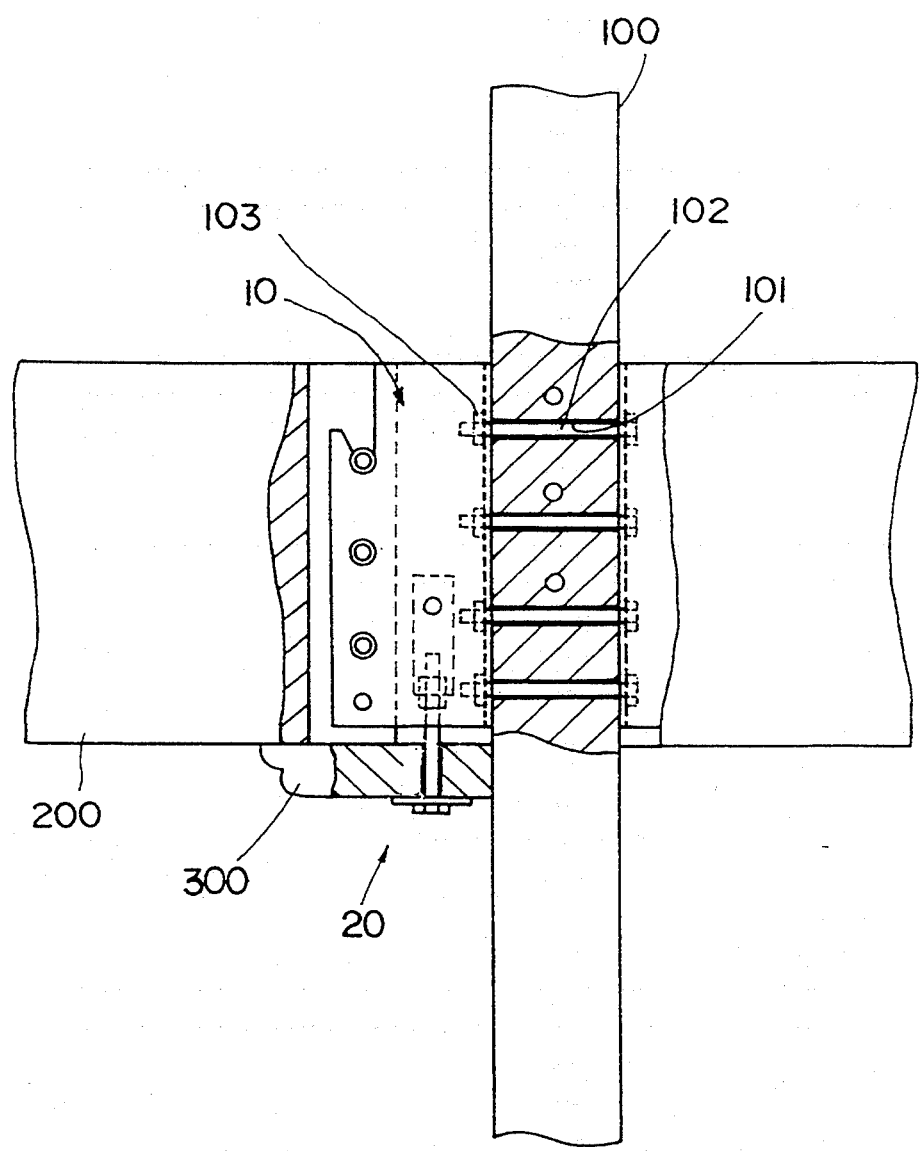
FIG. 3 is a schematic longitudinal sectional view showing the state in which wooden members are jointed together using the jointing metal fixture according to the first embodiment of the present invention.
Figure 4:
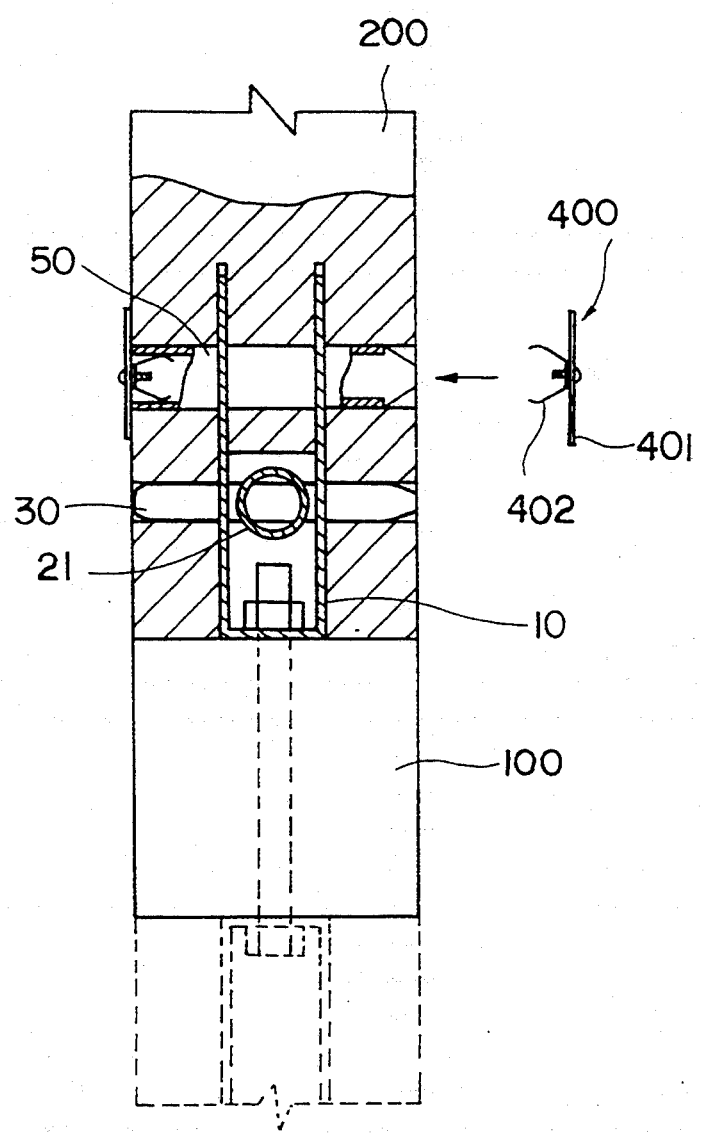
FIG. 4 is a schematic transverse sectional view showing the state in which wooden members are jointed together using the jointing metal fixture according to the first embodiment of the present invention.

FIG. 1 is an exploded perspective view showing a jointing metal fixture according to the first embodiment; FIG. 2 is an exploded perspective view showing the state in which wooden members are about to be jointed together using the jointing metal fixture of FIG. 1; FIG. 3 is a schematic longitudinal cross-sectional view showing the state in which the wooden members have ben jointed together using the jointing metal fixture of FIG. 1 and FIG. 4 is a transverse cross-sectional view corresponding to FIG. 3.

As shown in these figures, the jointing metal fixture of the embodiment illustrated is made up of a main member 10 for holding and securing the wooden members, a supporting member 20 secured to the main member 10 and an inserting pin 30 as fixation means for securing the supporting member 20 to the main member 10.

The main member 10 is made up of a back side 11 and a pair of lateral extensions 13. The back side 11 has a width narrower than the width of a wooden member 100, such as a pillar, to which the main member 10 is secured in position. A plurality of bolt holes 12 are formed along the longitudinal direction of the back side 11.

The lateral extensions 13 are formed by bending both sides of the back side 11 at a right angle for extending parallel to each other.

A plurality of J-shaped cogged joint grooves 14 are formed at upper portions of the front edges of the lateral extensions 13. A cogged joint dowel 40 is engaged in the cogged joint grooves 14. The cogged joint dowel 40 is cylindrical-shaped and usually formed of stainless steel.

A plurality of through-holes 15 are formed along the vertical direction along the front edges of the lateral extensions 13. A dowel 50 is passed through each of these through-holes 15. The dowel 50 is cylindrical-shaped and usually formed of stainless steel and has its distal end tapered for facilitated insertion into the through-hole 15.

A pin through-hole 16 is adapted for being passed through by the inserting pin 30 and is formed slightly below the transverse centerline of the lateral extensions 13.

Meanwhile, the numbers of the bolt holes 12, cogged joint grooves 14 and the through-holes 15 may be set optionally depending on the height and/or size of a wooden member, such as a joist 200.

The supporting member 20 is made up of a cylindrical-shaped main supporting body 21 and a bolt 24. One end of the main supporting body 21 is formed with a radial through-hole 22 adapted to be passed through by the inserting pin 30. To the other end of the main supporting body 21, there is secured, such as by welding, a nut 23 adapted to be threadedly engaged with the bolt 24 used for securing the design bracket.

A design bracket 300, secured to the supporting member 20, is machined to a size to cover up time interstice at a jointing portion of wooden members, and is formed at a mid part thereof with a bolt hole 301 passed through by the bolt 24. The design bracket 300 functions as a decorative member covering up the interstice of the jointing portion and as a fire stopper for stopping a flame tending to be propagated into the interstice at the jointing portion at the time of conflagration.

The inserting pin 30 is a means for securing the supporting member 20 to the main member 10 and is usually formed of stainless steel. Preferably, the inserting pin has its distal end tapered for facilitating insertion into the through-hole 16.

The jointing metal fixture, constructed as described above, is employed in the following manner.

For jointing the joist 200 to the pillar 100, bolts 102 are passed through bolt holes 101 of the pillar 100, and distal ends of the bolts 102 exiting at the opposite side of the pillar 100 are intruded into the bolt holes 12 formed in the back side 11 of the main member 10, while nuts are threadedly fitted to the ends of the bolts for securing the main member 10 to the pillar 100, as shown in FIGS. 2 and 3.

Only one main member 10 may be secured to one side of the pillar 100. Alternatively, two main members 10 may be secured to left and right sides of the pillar as shown. In the latter case, time bolts 102 are passed through the bolt holes 12 in one of the main members 10 and subsequently through the pillar 10 and the distal ends of the bolts exiting at the opposite side of the pillar 10 are subsequently engaged and secured in the bolt holes 12 of the other main member 10.

Subsequently, the cogged joint dowel 40 is driven into through-hole 201 formed in the joist 200 so as to be passed through the through-hole 201.

The operation up to this stage Is usually completed at a plant or the like.

On the construction site, for jointing the pillar 100 to the joist 200 or the like, the joist 200, previously passed through by the dowel 40, is fitted into the lateral extensions 13 of the main member 10 from above for fitting the cogged joint dowel 40 in the cogged joint groove 14 for temporarily supporting the joist 200 by the main member 10 and hence by the pillar 100. Subsequently, the dowels 50 are driven via the through-holes 202 formed in the joist 200 so as to be passed through both the through-holes 202 and the through-holes 15 in the main member 10 for tightly securing the joist 200 to the main member 10.

The above-described operation ,lay be carried out with the joist 200 remaining supported by the pillar 100 and hence may be carried out safely and easily even on the construction site with an adverse working environment.

Meanwhile, it is possible to provide the main member 10 with only one of the cogged joint groove 14 and the through-holes 15. If the main member 10 is provided only with the cogged joint groove 14, the operation of assembling the joist 200 to the main member 10 may be facilitated, whereas, if the main member 10 is provided only with the through-holes 15, the joist 200 may be secured to the main member 10 more reliably. Consequently, the present embodiment having both the cogged joint groove 14 and the through-hole 15 represents the most desirable mode in that the assembling operation of the joist 200 is facilitated and the joist 200 may be fixed more reliably to the main member 10.

If, depending on the size or weight of the joist 200, it is necessary for the joist 200 to be secured more fixedly to the pillar, the main member 10 and the joist 200 are formed with reinforcement pin through-holes 17 and 204, respectively, and a reinforcement pin 60 is driven into these through-holes for reinforcement.

The supporting main body 21 of the supporting member 20 is inserted, from the end thereof having the pin through-hole 22, into a space between the two lateral extensions 13, and the inserting pin 30 is driven into a pin through-hole 203 of the joist 200 so as to be passed through the pin through-hole 203, the pin through-holes 16 in the main member 10 and the pin through-hole 22 in the supporting main body 21.

The distal end of the bolt 24, introduced into the bolt hole 301 in the design bracket 300, is threadedly engaged with the nut 23 of the supporting main body 21 and tightened for securing the design bracket 300 to the lower surface of the jointing portion of the joist 200.

The machining operations required of the wooden members, such as machining of the jointing portion of the main member 10 with respect to the lateral extensions 13, boring of the through-holes 201, 202, pin through-hole 203 and the reinforcement hole 204 and the machining of the design bracket 300, are usually carried out in a plant having good working environments.

With the use of the above-described jointing metal fixture according to the illustrated embodiment, the joist 200 may be secured easily and fixedly on the construction site without the necessity of performing bolt (nut) tightening operations, while the interstices at the jointing portion of the wooden members may be covered up easily with the design bracket.

Meanwhile, a design cover 400 is made up of a cover member 401 having an area at least larger than the through-holes 201, 202 and a rod-shaped spring member 402, as shown in FIG. 4. The rod-shaped spring member 402 has its center secured to the center of the cover member 401 and its both sides flared, with the distal ends of the flared sections being bent inwards. The maximum width of the spring member 402 is broader than the inside diameter of the dowels 40 and 50, with the width of the distal ends being narrower than the inside diameter of the dowels 40 and 50.

After insertion of the cogged joint dowels 40 and 50, the design cover 400 is fitted via the through-holes 201, 202 of the joist 200 into the hollow inside of the cogged joint dowels 40 and 50 for covering up the through-holes 201, 202 on the lateral side of the joist 200 for improving aesthetic effects.

A second embodiment of the present invention will be explained by referring to FIG. 5.

Figure 5:
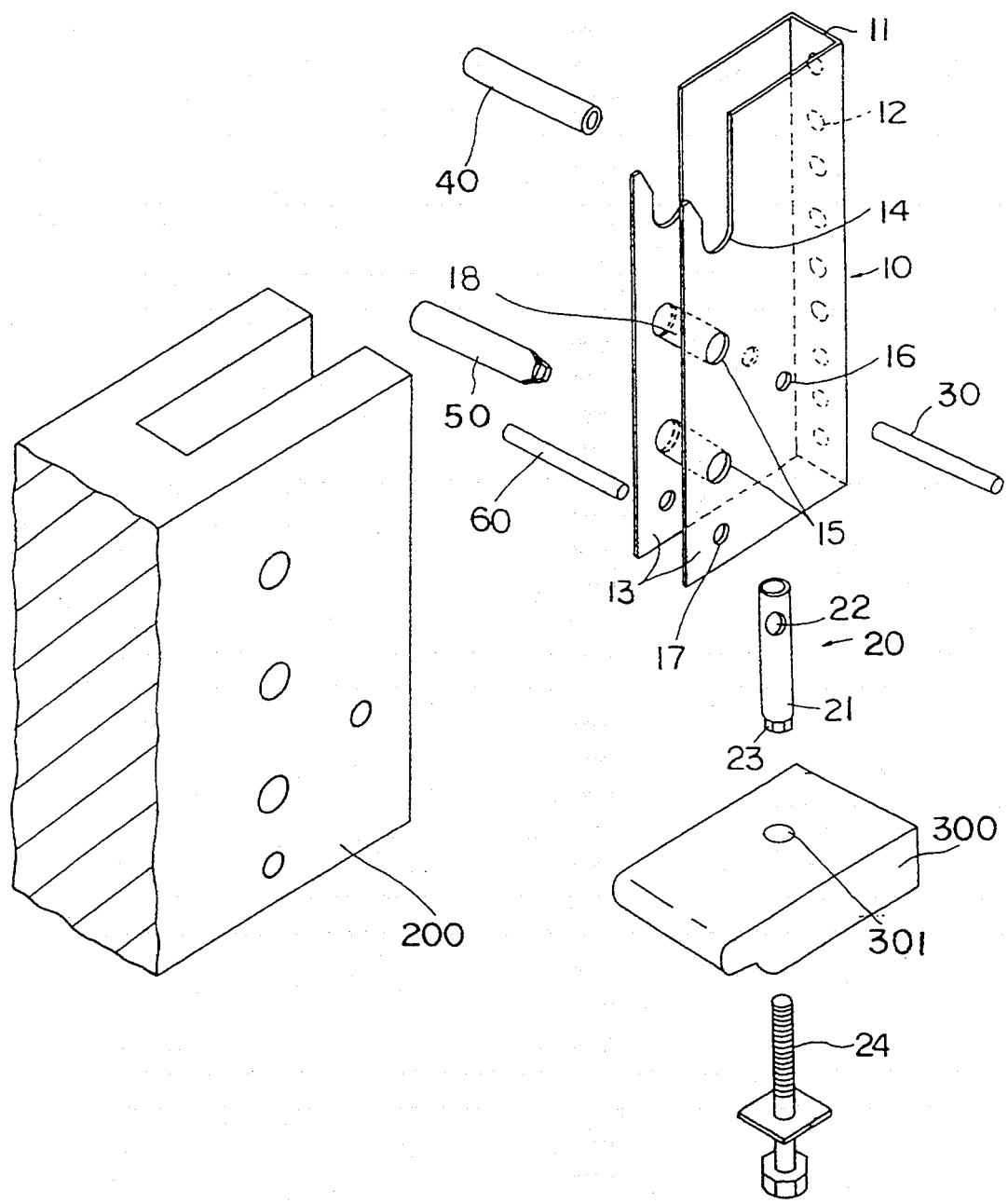
FIG. 5 is an exploded perspective view showing a jointing metal fixture according to a second embodiment of the present invention.

A jointing metal fixture according to the second embodiment is shown in an exploded perspective view in FIG. 5.

In this figure, a sleeve 18 is provided by securing a tubular member across the through-holes 15 of the main member 10, such as by welding.

By providing the sleeve 18 in this manner, it is unnecessary for the jointing portion off the joist 200 to be formed with narrow silts 200a to permit insertion therein of the lateral extensions 13, but it is only necessary to form a recess to a larger depth, so that the construction is simplified as compared to the first embodiment and hence the labor in machining the jointing portion may be saved.

Besides, by providing the sleeve 18 in this manner, the dowel 50 may be inserted into the maim member 10 more easily so that the machining operation of tapering the end part of the dowel 50 may be eliminated.

Also, since the strength of the through-hole 15 may be maintained by the sleeve 18, it become possible to fabricate the dowel 50 from a wooden material. If the dowel 50 is formed of wood, the portion of the dowel 50 exposed on the lateral surface of the joist 200 is of the same wooden material as that of the joist 200, so that it becomes unnecessary to use the decorative cover 400 which is desirable from appearance as compared to the case of using the dowel formed of, for example, stainless steel.

A third embodiment of the present invention will be explained by referring to FIGS. 6 and 7.

Figure 6:
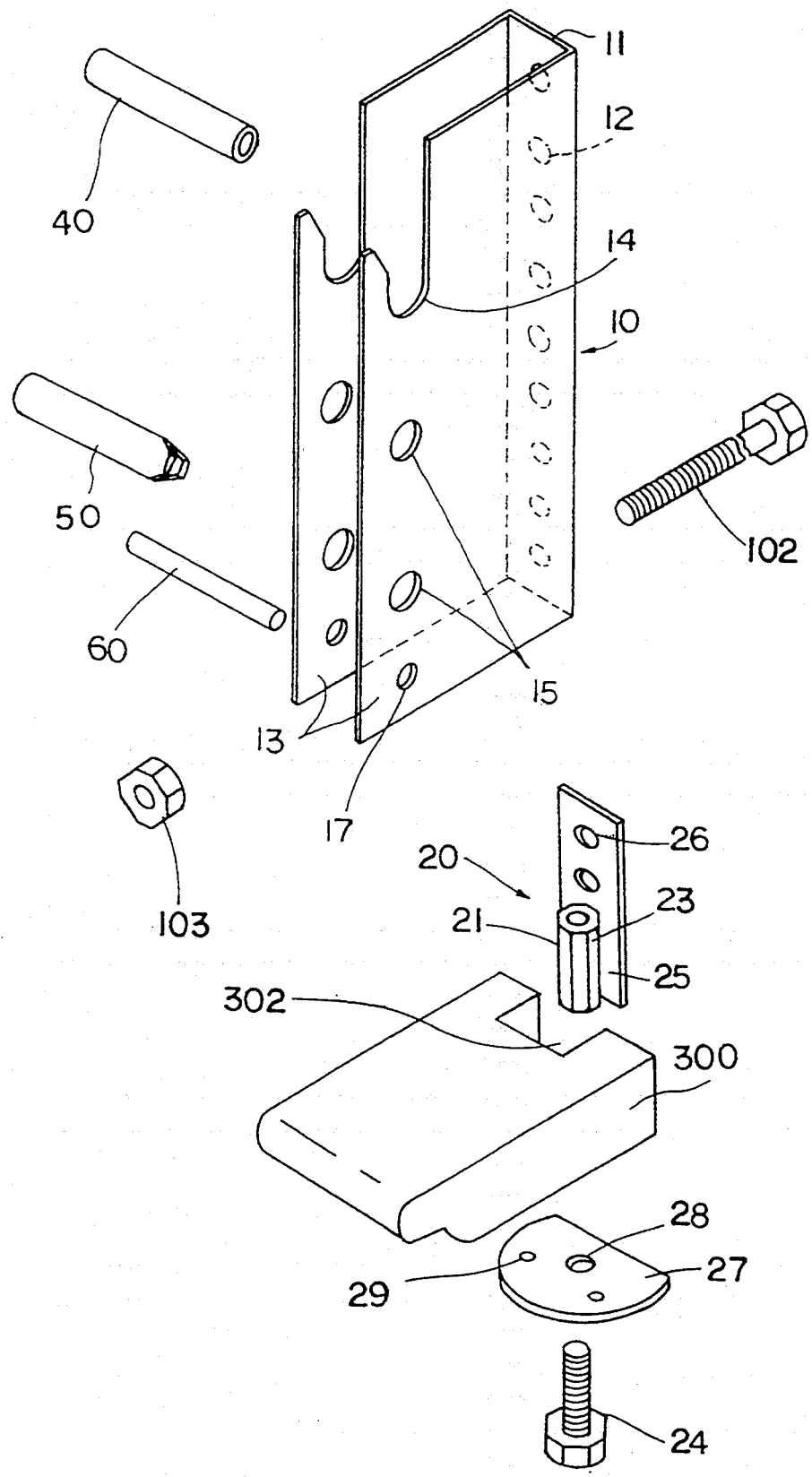
FIG. 6 is an exploded perspective view showing a jointing metal fixture according to a third embodiment of the present invention.
Figure 7:
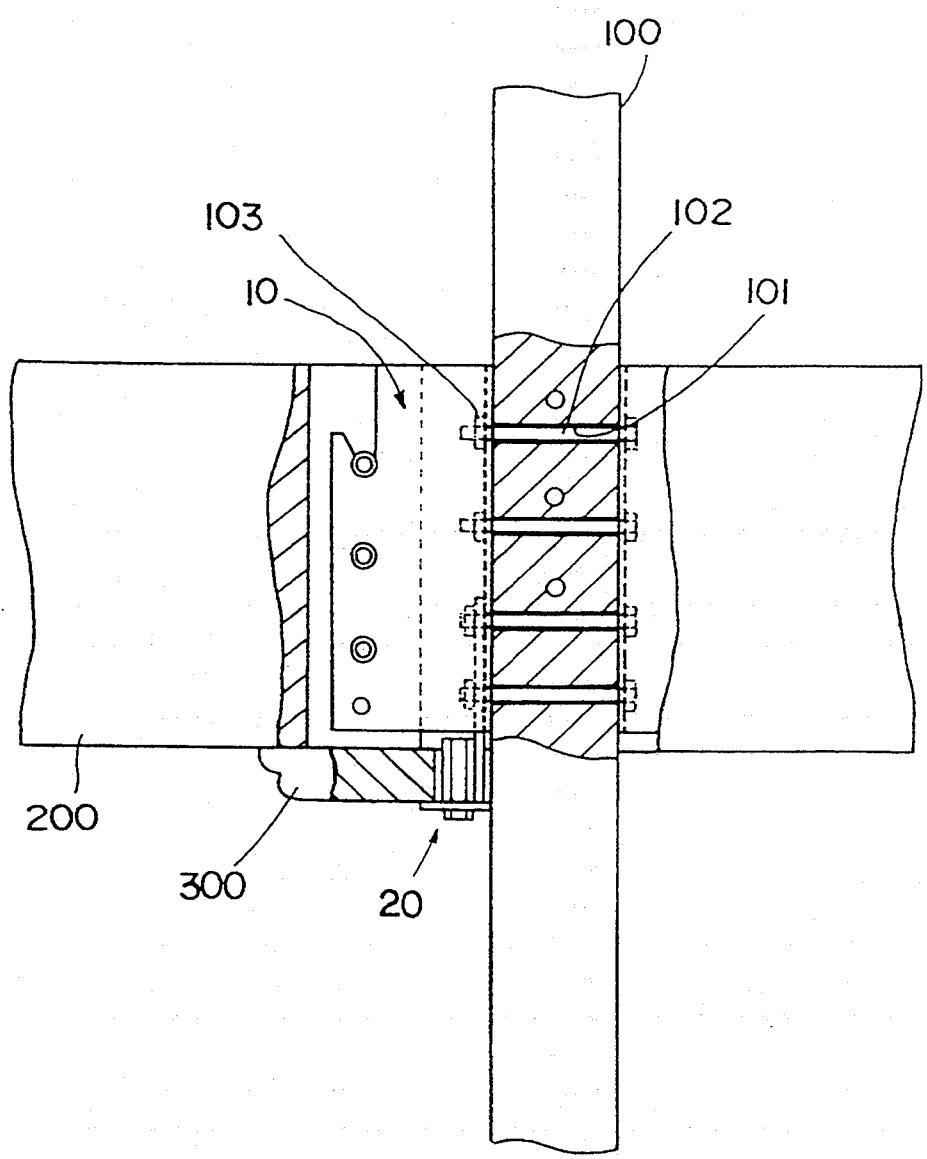
FIG. 7 is a schematic longitudinal sectional view showing the state in which wooden members are jointed together using the jointing metal fixture according to the third embodiment of the present invention.

FIG. 6 shows a jointing metal fixture according to the present third embodiment, in an exploded perspective view, and FIG. 7 shows the state of jointing wooden members using the jointing metal fixture shown in FIG. 6, in a schematic longitudinal cross-sectional view.

As shown in these figures, the supporting member 20 in the present embodiment comprises a bolt 24, a nut 23 adapted to be threaded fixed to the bolt 24, a tightening member 25 secured to the lateral side of the nut 23, and a washer 27. Meanwhile, the nut 23 and the tightening member 25 make up the supporting main body 21.

The tightening member 25 is formed with tightening holes 26 adapted to be engaged by the bolt 102 adapted for tightening the main member 10 with respect to the pillar 100. Although the tightening holes 26 in the present embodiment are shown as being through-holes, they may be tapped holes functioning as nuts, in which case the nut 103 may be omitted.

Although the nut 23 and the tightening member 25 are shown as separate members in the present embodiment, these may be combined into a one-piece member having the nut and the tightening hole, such that a member similar to the supporting main body 21 of the above-described first embodiment suffices. Consequently, the tightening member 25 is not limited to the plate-shaped member as shown.

The washer 27 is a disk-shaped member for holding the design bracket 300, and is formed with a straight segment to allow for tight contact with the pillar 100. The planar surface of the washer 27 is formed with a central bolt hole 28 to permit insertion of the bolt 24 and nail holes 29 at arbitrary positions for securing the design bracket 300 against extrication in the lateral direction.

Meanwhile, in the present embodiment, the bolts 102 are used simultaneously for securing the supporting main body 21 in position, as shown In FIG. 7.

The design bracket 300 is not formed with the bolt hole 301 as provided in the first embodiment and, in its stead, is formed with a recess 302 on the surface thereof facing the pillar 100. The recess 302 is dimensioned to accommodate the supporting main body 21 therein.

The jointing metal fixture of the above-described third embodiment is employed in the following manner.

The operations of securing the main member 10 to the pillar 100 or securing the joist 200 to the main member by the cogged joint dowel 40 are carried out in a plant, as in the above-described first embodiment.

Since the bolts 102 are employed in the present embodiment simultaneously as securing means for the supporting main body 10, as mentioned above, it is possible to secure the supporting main body 21 to the main member 10 simultaneously when securing the main member 10 to the pillar 100.

That is, the bolts 102 are passed through the bolt holes 101 in the pillar 100 and the distal end portions of the bolts 102 exiting from the opposite surface of the pillar 100 are inserted through the bolt holes 12 in the back side 11 of the main member 10 and through the tightening holes 26 in the tightening member 25 of the supporting main body 21. Subsequently, the nuts 103 are tightened to the distal ends of the bolts 102.

In this manner, the main member 10 and the supporting main body 21 are secured to the pillar 100.

On the construction site, the joist 200 is jointed to the pillar 100 by the same sequence of operations as that employed for the first embodiment.

Subsequently, the supporting main body 21 is covered with the design bracket 300, and the washer 27 is placed on the lower surface of the design bracket 300 with the straight segment of the washer facing the pillar 100. The bolt 24 is threaded with the nut 23 via the bolt hole 28 in the washer 27 and tightened in position, and nails, not shown, are driven into the design bracket 300 via the nail holes 29 in the washer 27.

The design bracket 300 is secured in this manner to the lower surface of the joist 200.

It is to be noted that the present invention is not limited to the above-described embodiments and may comprise a latitude of modifications falling under the scope of the invention defined in the summary of the invention. For example, the supporting main body 21 may be square-shaped, instead of being circular, in the cross-sectional profile.

The nut 23 of the supporting main body 21 may be arranged as a bolt and the bolt 24 may be replaced by a nut.

The cogged joint dowel 40 or the dowel SO may also be square-shaped in cross-sectional profile instead of being circular.

The jointing metal fixture of the present invention may also be employed for jointing wooden members other than the pillar or the joist.

The wooden members employed may also be formed of plywood materials.

What is claimed is:

1. A metal fixture employed for jointing wooden members together in a wooden structure, comprising:
   a main member having a back side adapted to be secured to one wooden member, and a pair of lateral extensions extending forwardly from the back side and arranged parallel to each other, each of the lateral extensions having a pin through-hole, and at least one of a cogged joint groove and a through hole,
   a design bracket disposed under the main member and adapted to cover a jointing portion of the wooden members,
   a supporting member for supporting the design bracket under the main member, said supporting member having a cylindrical member having a pin through-hole and attached to the main member, a nut fixed to a lower end of the cylindrical member, and a bolt engaging the nut and supporting said design bracket under the main member, and
   an insertion pin disposed between the cylindrical member and the main member for fixing the supporting member to the main member, said insertion pin passing through the pin through-holes of the lateral extensions and the cylindrical member.

2. A metal fixture employed for jointing wooden members in a wooden construction, comprising:
   a main member having a back side adapted to be secured to a wooden member, a pair of lateral extensions projected at right angles to said back side in parallel with each other, at least one of cogged joint grooves and through-holes formed in each of said lateral extensions, and pin through-holes formed in said lateral extensions,
   a design bracket situated under the main member,
   a supporting member for supporting the design bracket and including a supporting main body having a nut at one end and a pin through-hole at the other end, and a bolt supporting said design bracket and adapted to be threadedly engaged with the nut of the supporting main body, and
   fixation means for fixing said supporting member and said main member to each other, said fixation means being an inserting pin passing through said pin through-holes of the main member and said pin through-hole of the supporting member.

3. A metal fixture employed for jointing wooden members in a wooden construction, comprising:
   a main member including a back side adapted to be secured to a wooden member and having bolt holes, a pair of lateral extensions projected at right angles to said back side in parallel with each other, and at least one of cogged joint grooves and through-holes formed in each of said lateral extensions,
   a design bracket situated under the main member,
   a supporting member for supporting the design bracket and including a supporting main body having a nut and a tightening member secured to a lateral side of the nut and having tightening holes, and a bolt supporting said design bracket and threadedly engaging said nut, and
   fixation means for fixing said supporting member and said main member to each other, said fixation means including bolts introduced through the bolt holes of the main member and tightened at the tightening holes.

4. A metal fixture as claimed in claim 3, wherein said bolts pass through the tightening holes and tightened by nuts.

5. A metal fixture as claimed in claim 3, wherein said tightening holes includes threads therein, said bolts engaging the threads of the tightening holes.

6. A metal fixture employed for jointing wooden members together in a wooden structure, comprising:
   a main member having a back side adapted to be secured to one wooden member and having at least one bolt hole, and a pair of lateral extensions extending forwardly from the back side and arranged parallel to each other, each of the lateral extensions having at least one of a cogged joint groove and a through hole,
   a design bracket disposed under the main member and adapted to cover a jointing portion of the wooden members,
   a supporting member for supporting the design bracket under the main member, said supporting member including a supporting main body having at least one tightening hole and attached to the main member, a nut fixed to a lower end of the supporting main body, and a bolt engaging the nut and supporting said design bracket under the main member, and
   at least one bolt disposed between the supporting main body and the main member for fixing the supporting member to the main member, said at least one bolt passing through the bolt hole and the tightening hole.

* * * * *